(12) United States Patent
Shimada et al.

(10) Patent No.: US 12,130,146 B2
(45) Date of Patent: Oct. 29, 2024

(54) TRAVEL PLAN PROPOSAL SYSTEM

(71) Applicant: Nomura Research Institute, Ltd., Tokyo (JP)

(72) Inventors: Takeo Shimada, Tokyo (JP); Kimihiko Asabe, Tokyo (JP); Jun Kuroda, Tokyo (JP)

(73) Assignee: Nomura Research Institute, Ltd., Tokyo (JP)

( * ) Notice: Subject to any disclaimer, the term of this patent is extended or adjusted under 35 U.S.C. 154(b) by 234 days.

(21) Appl. No.: 17/940,061

(22) Filed: Sep. 8, 2022

(65) Prior Publication Data

US 2023/0304805 A1   Sep. 28, 2023

Related U.S. Application Data

(63) Continuation-in-part of application No. PCT/JP2020/013172, filed on Mar. 24, 2020.

(51) Int. Cl.
*G01C 21/34* (2006.01)
*G01C 21/36* (2006.01)

(52) U.S. Cl.
CPC ....... *G01C 21/343* (2013.01); *G01C 21/3697* (2013.01)

(58) Field of Classification Search
CPC ... G01C 21/343; G01C 21/3697; G06Q 50/14
See application file for complete search history.

(56) References Cited

U.S. PATENT DOCUMENTS

| | | | | |
|---|---|---|---|---|
| 5,948,040 | A * | 9/1999 | DeLorme | G06Q 10/02 701/426 |
| 8,082,186 | B1 * | 12/2011 | Shuchman | G06Q 10/025 705/26.5 |
| 8,600,805 | B2 * | 12/2013 | Wallace | G06Q 50/14 705/5 |
| 9,841,288 | B2 * | 12/2017 | Huber | G01C 21/3679 |
| 10,445,666 | B1 * | 10/2019 | Lopez | G06Q 10/025 |
| 10,755,711 | B2 * | 8/2020 | Oikawa | G10L 15/22 |
| 11,164,269 | B1 * | 11/2021 | Locke | H04W 4/024 |
| 11,295,275 | B2 * | 4/2022 | Choi | G06F 3/0482 |
| 11,755,964 | B2 * | 9/2023 | Wallace | G06Q 10/025 705/6 |
| 11,928,615 | B1 * | 3/2024 | Chung | G06Q 30/0255 |

(Continued)

*Primary Examiner* — Kenny Nguyen
(74) *Attorney, Agent, or Firm* — RANKIN, HILL & CLARK LLP

(57) ABSTRACT

A travel plan proposal system includes: a destination deriving unit configured to derive a predetermined number of destination areas from all destination areas on the basis of vacancy rates calculated for a plurality of accommodation facilities in the destination areas for each schedule pattern, and derive a candidate for the travel plan including a combination of the schedule pattern and the destination areas for the respective nights to stay; and a route deriving unit configured to set, for each candidate for the travel plan, a predetermined route for sequentially moving from a departure place to the respective destination areas and returning, and transportation means, and derive a candidate for the travel plan in which a total of representative accommodation costs of the destination areas in the candidate for the travel plan and a total of expenses required for the transportation means are within a budget.

6 Claims, 14 Drawing Sheets

(56) References Cited

U.S. PATENT DOCUMENTS

| | | | |
|---|---|---|---|
| 2009/0216633 A1* | 8/2009 | Whitsett | G06Q 30/02 705/26.1 |
| 2011/0307280 A1* | 12/2011 | Mandelbaum | G06Q 10/025 705/6 |
| 2012/0136683 A1* | 5/2012 | Wallace | G06Q 10/02 705/6 |
| 2013/0117057 A1* | 5/2013 | Van Moltke | G01C 21/3415 705/7.13 |
| 2013/0198026 A1* | 8/2013 | Platzker | G06Q 30/0611 705/26.4 |
| 2014/0019176 A1* | 1/2014 | Mandelbaum | G06Q 10/025 705/6 |
| 2014/0067442 A1* | 3/2014 | Wallace | G06Q 50/14 705/6 |
| 2016/0364454 A1* | 12/2016 | Yang | G06F 16/24575 |
| 2018/0172458 A1* | 6/2018 | Yamamoto | G01C 21/3438 |
| 2018/0181922 A1* | 6/2018 | Choi | G06Q 10/06311 |
| 2019/0122664 A1* | 4/2019 | Oikawa | G10L 25/54 |
| 2022/0065633 A1* | 3/2022 | Beaurepaire | G01C 21/343 |
| 2022/0101211 A1* | 3/2022 | Wallace | G06Q 30/0207 |
| 2023/0306317 A1* | 9/2023 | Karri | G01C 21/3647 |
| 2024/0104440 A1* | 3/2024 | Wong | G06Q 10/02 |

* cited by examiner

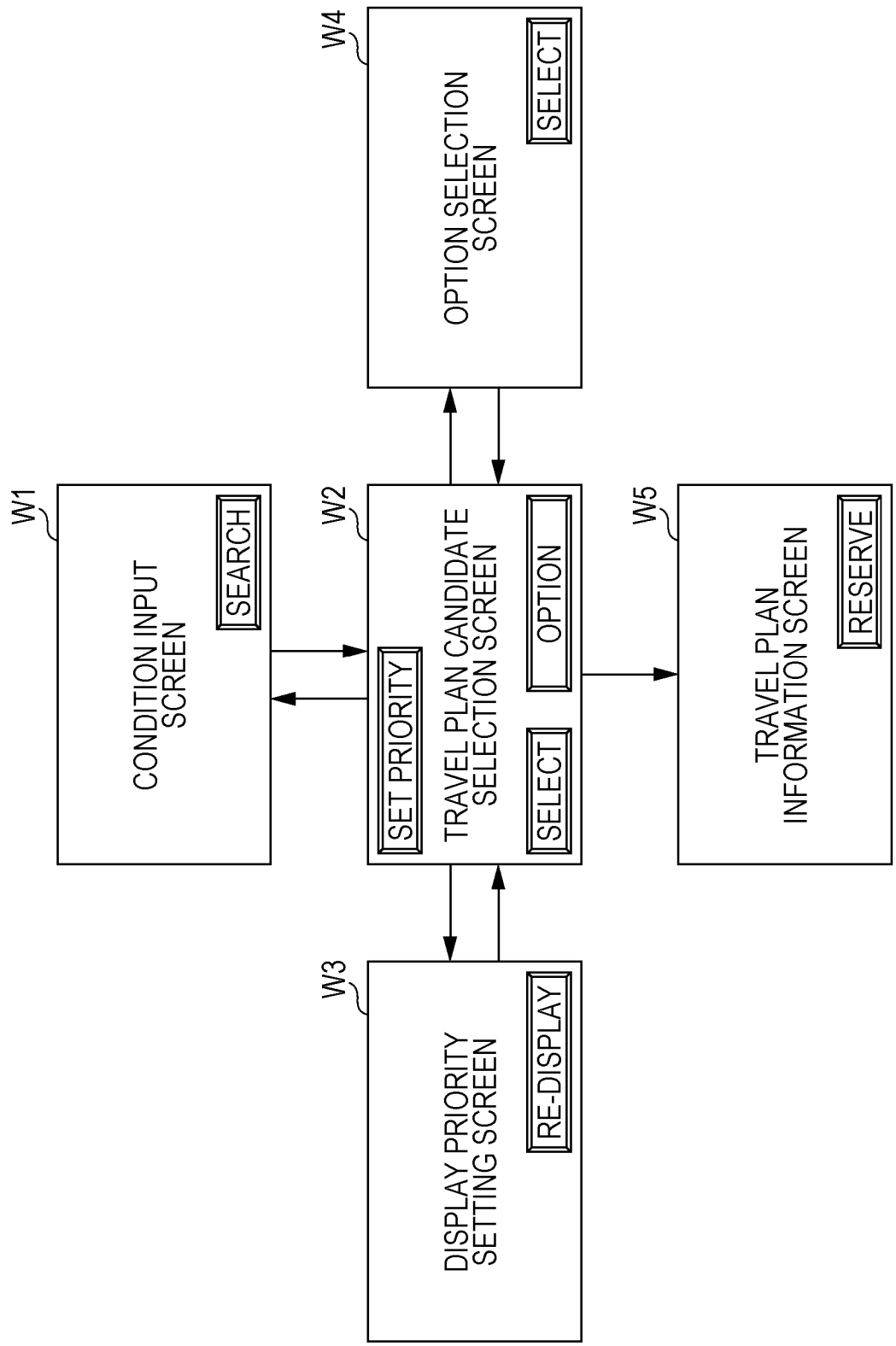

FIG. 3

| CONDITION INPUT | | |
|---|---|---|
| TOTAL BUDGET | 200,000 | YEN |
| DEPARTURE PLACE | TOKYO ▽ | |
| DESIRED TRAVEL START DATE | JULY 1 ▽ | |
| DESIRED TRAVEL END DATE | JULY 31 ▽ | |
| THE NUMBER OF NIGHTS TO STAY | 2 ▽ | |

◉ DESIRE TO STAY IN SAME ACCOMMODATION FACILITY
○ DESIRE TO STAY IN DIFFERENT ACCOMMODATION FACILITIES
(THE NUMBER OF ACCOMMODATION FACILITIES ▢ ▽ )

THE NUMBER OF PEOPLE  ADULT 2 ▽  CHILD 1 ▽  INFANT 1 ▽

GENDER  MALE 2 ▽  FEMALE 2 ▽

[SEARCH]

TRAVEL PLAN CANDIDATE SELECTION — W2

RECOMMENDED SCHEDULE | JULY 2 TO JULY 4 | NEXT CANDIDATE | SET CONDITION

BUDGET FOR ENTIRE ROUTE | 150,000 YEN | ACCOMMODATION PLACE FOR JUL. 2: ASO, ACCOMMODATION PLACE FOR JUL. 3: BEPPU

FIRST DAY: TOKYO-(A)->FUKUOKA AIRPORT-(B)->JR HAKATA-(C)->JR KUMAMOTO-(D)->ASO

| (A) | (B) | (C) | (D) |
|---|---|---|---|
| JNA303 29,000 06:15-08:05 | MUNICIPAL SUBWAY 250 08:30-08:40 | TSUBAME 301 4,000 09:00-10:10 | BUS 2,000 10:30-11:30 |
| AAL402 30,000 07:10-09:00 | MUNICIPAL SUBWAY 250 09:20-09:30 | TSUBAME 302 4,000 10:00-11:10 | BUS 3,000 12:00-13:00 |
| JNA304 31,000 08:05-10:00 | MUNICIPAL SUBWAY 250 10:20-10:30 | TSUBAME 402 4,000 11:00-12:10 | BUS 2,000 13:00-14:00 |

HOTEL

| |
|---|
| AA HOTEL 30,000 |
| BB INN 10,000 |
| HOTEL CC 10,000 |

SECOND DAY: ASO-(A)->JR KUMAMOTO-(B)->JR KURUME-(C)->-(D)->JR BEPPU (A) (B) (C) (D)

DISPLAY PRIORITY SETTING

△ ▽  PRICE
△ ▽  GRADE OF ROOM
△ ▽  GRADE OF MEAL
△ ▽  TRAVELING PERIOD
△ ▽  NO SMOKING

RE-DISPLAY

OPTION SELECTION

FUKUOKA AREA

☑ RAFTING IN YANAGAWA
......

☐ KYUSHU NATIONAL MUSEUM
......

☐ MEAL TICKET FOR EEL
......

☐ YONQ PASS
......

SELECT

```
TRAVEL PLAN INFORMATION                                            W3
BUDGET FOR ENTIRE ROUTE    83,000 YEN

🚄  JULY 2, SHINAGAWA–KOKURA, NOZOMI XXX
  🚃  JULY 2, KOKURA–OITA
  🚃  JULY 2, OITA–ASO
  🚃  JULY 2, ASO–HAKATA
  🏨  HOTEL XYZ HAKATA CHUOU     PLAN:                 DINNER,
                                  JAPANESE AND         BREAKFAST
                                  WESTERN ROOM         INCLUDED
  🚄  JULY 3, HAKATA–SHINAGAWA, NOZOMI YYY

[ RESERVE ]
```

FIG. 13

| DESTINATION AREA | BELONGING AREA | LONGITUDE, LATITUDE | SIGHTSEEING INFORMATION ID | SALE ADJUSTMENT VALUE | ADJUSTMENT START TIME | ADJUSTMENT END TIME |
|---|---|---|---|---|---|---|
| NORTHERN PART OF KUMAMOTO | KYUSHU | 32.X 131.X | A1234 | 10 | 2020/04/01 | 2020/04/20 |
| MIDDLE PART OF KUMAMOTO | KYUSHU | 32.X 130.X | B9876 C2468 | 20 | 2020/04/01 | 2020/04/30 |
| ... | ... | ... | ... | ... | ... | ... |

| ACCOMMODATION FACILITY NAME | DESTINATION AREA | NEAREST STATION | LONGITUDE, LATITUDE | ADDRESS | ROOM TYPE | THE NUMBER OF ROOMS | STAY DATE | PRICE | MEAL | THE NUMBER OF VACANT ROOMS |
|---|---|---|---|---|---|---|---|---|---|---|
| ○○ HOTEL | WESTERN PART OF FUKUOKA | HAKATA | 33.X 130.X | FUKUOKA-SHI, FUKUOKA PREFECTURE | SINGLE | 100 | 6/11 | 30,000 | DINNER AND BREAKFAST | 10 |
| △△ INN | NORTHERN PART OF KUMAMOTO | ASO | 32.X 131.X | ASO-SHI, KUMAMOTO PREFECTURE | TWIN | 48 | 6/11 | 18,000 | BREAKFAST | 35 |
| ⋮ | ⋮ | ⋮ | ⋮ | ⋮ | ⋮ | ⋮ | ⋮ | ⋮ | ⋮ | ⋮ |

| DEPARTURE PLACE | ARRIVAL PLACE | TRANSPORTATION MEANS | AVERAGE REQUIRED TIME PERIOD |
|---|---|---|---|
| HANEDA | FUKUOKA | AIRPLANE | 90 |
| SHIN-KOBE | SHIN-YAMAGUCHI | BULLET TRAIN | 99 |
| KANAZAWA | KOMATSU | CONVENTIONAL LINE | 40 |
| NAGOYA | TOKYO | EXPRESSWAY BUS | 376 |
| ... | ... | ... | ... |

| DEPARTURE PLACE | ARRIVAL PLACE | TRANSPORTATION MEANS | SERVICE NAME | DEPARTURE TIME | ARRIVAL TIME | TRAFFIC EXPENSE | EFFECTIVE START TIME | EFFECTIVE END TIME |
|---|---|---|---|---|---|---|---|---|
| HANEDA | FUKUOKA | AIRPLANE | JNA○○ | 8:00 | 9:30 | 37,000 | 2020/7/1 | 2020/7/31 |
| SHIN-KOBE | SHIN-YAMAGUCHI | BULLET TRAIN | NOZOMI XX | 9:00 | 10:39 | 7,500 | 2020/7/1 | 2020/7/31 |
| KANAZAWA | KOMATSU | CONVENTIONAL LINE | HOKURIKU LINE | 9:00 | 9:40 | 510 | 2020/7/1 | 2020/7/31 |
| NAGOYA | TOKYO | EXPRESSWAY BUS | S LINER XX | 12:00 | 18:16 | 5,000 | 2020/7/1 | 2020/7/31 |
| ... | ... | ... | ... | ... | ... | ... | ... | ... |

FIG. 17

| ARRIVAL TRANSIT PLACE | ARRIVAL TRANSPORTATION MEANS | DEPARTURE TRANSIT PLACE | DEPARTURE TRANSPORTATION MEANS |
|---|---|---|---|
| HANEDA | AIRPLANE | HANEDA | CONVENTIONAL LINE |
| SHIN-KOBE | BULLET LINE | SHIN-KOBE | CONVENTIONAL LINE |
| HAKATA | BULLET LINE | HAKATA | EXPRESSWAY BUS |
| ... | ... | ... | ... |

TRAVEL PLAN PROPOSAL SYSTEM

BACKGROUND

Technical Field

The present invention relates to a technique for proposing a travel route, and particularly to a technique effective to be applied to a destination proposal type travel plan proposal system in consideration of regional revitalization.

Related Art

For example, JP 5982066 B1 discloses an airline ticketing system that enables effective and efficient sales of stock for both users and sellers in consideration of stock quantities on outward ways and return ways to and from each candidate place in an airline ticketing mechanism in which a system extracts candidate places and determines a final destination. In the system, it is possible to promote sales of the stock by preferentially selecting a candidate place desired by the seller, and it is also possible to provide the user with surprise and expectation for travel by keeping an automatically determined destination secret to the user until immediately before departure.

Furthermore, for example, JP 2014-142784 A discloses a travel plan providing device that provides a travel plan that excites a user by creating a travel plan with an input of information indicating departure date and return date of travel, a budget of travel, and a purpose of travel, the travel plan being a plan of departure on the departure date of travel, moving to a facility that matches the purpose of travel, and returning on the return date, and with costs within the budget.

SUMMARY

According to the technique as described in JP 5982066 B1, it is possible for a seller to efficiently and effectively promote sales of stock while providing a user with a sense of surprise and expectation that a destination is not determined until just before departure.

On the other hand, in recent years, also in a travel industry, "regional revitalization" recited by the government has become one of keywords, and it is considered that the travel industry can often contribute to how to activate local economy and culture, and various ideas have been studied. Such an approach is not limited to Japan and can also be applied in an international framework.

Under such circumstances, there is a need for a side of proposing and providing travel to select and propose a destination, which holds a viewpoint of sales of stock such as airline tickets, to further contribute to regional revitalization, thereby leading to activation of the travel and transportation industry in addition to activation of economy and culture in the local area. While this point seems to be achieved by setting a purpose related to regional revitalization as a purpose of travel according to the technique as described in JP 2014-142784 A, there is no suggestion as to what kinds of purpose should be set. Furthermore, it is difficult to say that JP 2014-142784 A sufficiently describes a specific implementation method, and it can be said that there is no suggestion as to how to implement the method in order to meet the above needs.

Thus, an object of the present invention is to provide a travel plan proposal system that proposes a travel plan that can contribute to activation of an area or a region of a destination within a range of a budget while providing a user with a sense of surprise and expectation for travel.

The above-described and other objects and novel features of the present invention will be clarified by the description herein and the attached drawings.

Outline of a representative one of the inventions disclosed in the present application will be briefly described as follows.

A travel plan proposal system according to a representative embodiment of the present invention is a travel plan proposal system that proposes a travel plan to a user, the travel plan including a combination of one or more destination areas, accommodation facilities in the respective destination areas, and a route and transportation means for moving between the destination areas, the travel plan proposal system including a destination information recording unit configured to store information on all destination areas set in a travelable area; and an accommodation facility information recording unit configured to store information, including accommodation costs, concerning the accommodation facilities in the respective destination areas.

The travel plan proposal system further includes a destination deriving unit configured to extract a predetermined number of destination areas from a plurality of destination areas stored in the destination information recording unit on the basis of vacancy rates calculated for a plurality of accommodation facilities located in the destination areas for stay dates included in a schedule pattern for each schedule pattern obtained from a desired travel period and the number of nights to stay designated by the user and derive one or more candidates for the travel plan including a combination of the schedule pattern and the destination areas for each of the stay dates.

In addition, the travel plan proposal system further includes a route driving unit configured to set, for each of the candidates for the travel plan, a predetermined route for sequentially moving from a departure place of the user to the respective destination areas included in the candidates for the travel plan and returning to the departure place on the basis of information including lines, a required time period, and a transit point included in predetermined transportation means, and transportation means to be used for moving, and derive, as a proposed candidate for the travel plan, the candidate for the travel plan in which a total of representative accommodation costs of the destination areas in the candidate for the travel plan and a total of traffic expenses required for the transportation means to be used for moving are within a budget designated by the user.

Advantageous effects of the invention disclosed in the present application that are achieved by a representative embodiment will be briefly described as follows.

In other words, according to the representative embodiment of the present invention, it is possible to implement a travel plan proposal system that proposes a travel plan that can contribute to activation of an area or a region of a destination within a range of a budget while providing a user with a sense of surprise and expectation for travel.

BRIEF DESCRIPTION OF DRAWINGS

FIG. 2 is a view illustrating outline of an example of screen transition according to an embodiment of the present invention;

FIG. 3 is a view illustrating outline of an example of a condition input screen according to an embodiment of the present invention;

FIG. 4 is a view illustrating outline of an example of a travel plan candidate selection screen according to an embodiment of the present invention;

FIG. 13 is a view illustrating outline of a configuration of a destination master DB and examples of specific data according to an embodiment of the present invention;

FIG. 14 is a view illustrating outline of a configuration of an accommodation facility DB and examples of specific data according to an embodiment of the present invention;

FIG. 15 is a view illustrating outline of a configuration of a line master DB and examples of specific data according to an embodiment of the present invention;

FIG. 16 is a view illustrating outline of a configuration of a transportation means master DB and examples of specific data according to an embodiment of the present invention; and FIG. 17 is a view illustrating outline of a configuration of a transit point master DB and examples of specific data according to an embodiment of the present invention.

DETAILED DESCRIPTION

Figure 1:
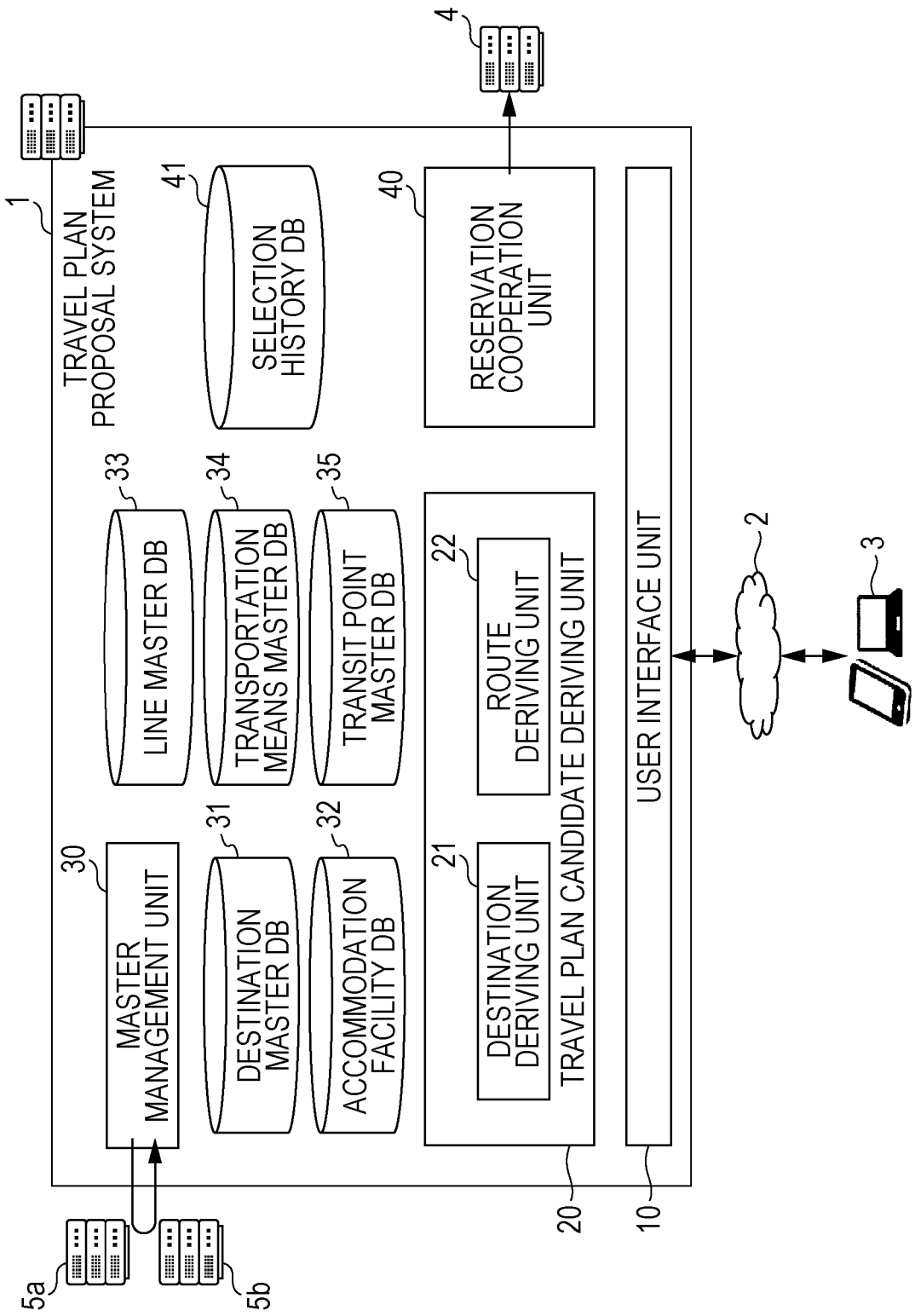
FIG. 1 is a view illustrating outline of a configuration example of a travel plan proposal system according to an embodiment of the present invention.

An embodiment of the present invention will be described below in detail. In all the drawings for describing the embodiment, identical parts are in principle given identical reference numerals, and duplicated description thereof will be omitted. Meanwhile, a component described with a reference numeral with reference to one drawing may be mentioned again with the same reference numeral in the description with reference to other drawings in which the component is not illustrated.

<System Configuration>

FIG. 1 is a view illustrating outline of a configuration example of a travel plan proposal system according to an embodiment of the present invention. A travel plan proposal system 1 of the present embodiment is an information processing system that enables the system to derive and propose to a user who has a request such as "I want to go somewhere with a budget of about X thousand yen from date A to date B", candidates for a travel plan of going around one or more destinations on the basis of the request. This makes it possible to preferentially select and propose mainly an inactive area (that is, an area with large stock (vacant rooms) of accommodation facilities) as a destination and attract a user to the destination, leading to activation of the destination area and to provide the user with surprise regarding selection of the destination and a travel plan.

The travel plan proposal system 1 of the present embodiment is constituted as a server system by, for example, one or more server devices, a virtual server constructed on a cloud computing service, and the like. Then, various functions which will be described later related to proposal of the travel plan is implemented by a central processing unit (CPU) (not illustrated) executing an operating system (OS) loaded from a recording device such as a hard disk drive (HDD) on a memory, middleware such as a database management system (DBMS) and a web server program, and software operating on the middleware. In addition, the travel plan proposal system 1 has a configuration to which a user terminal 3 including a personal computer (PC), a tablet terminal, a smartphone, or the like, held by the user can be connected via a network 2 such as the Internet.

The travel plan proposal system 1 includes, for example, units such as a user interface unit 10, a travel plan candidate deriving unit 20, a master management unit 30, and a reservation cooperation unit 40 implemented as software. In addition, the travel plan proposal system 1 includes each data store such as a destination master database (DB) 31, an accommodation facility DB 32, a line master DB 33, a transportation means master DB 34, a transit point master DB 35, and a selection history DB 41 implemented by a database, or the like.

The user interface unit 10 has a function of providing a user interface such as a screen related to proposal of the travel plan to the user terminal 3. In other words, an input of a desired condition of travel is received and acquired from the user via a screen to be displayed on the user terminal 3. In addition, a candidate for the travel plan derived by a travel plan candidate deriving unit 20 to be described later is displayed, and an input of selection or correction of the travel plan is received and acquired. Transition and content of the screen to be displayed on the user terminal 3 by the user interface unit 10 will be described later.

The travel plan candidate deriving unit 20 further includes a destination deriving unit 21 and a route deriving unit 22 implemented by software and has a function of deriving a candidate for a travel plan (one or more destinations and accommodation facilities and a combination of a route for moving between the destinations and transportation means) matching the condition on the basis of the desired condition of the travel designated by the user.

The destination deriving unit 21 has a function of deriving a candidate for a destination to be visited for each date within a desired period on the basis of a budget designated by the user and information on a desired period of travel and the number of nights to stay. Although details of a method of deriving a candidate for a destination will be described later, basically, as described above, by preferentially selecting an inactive area, that is, an area having a high vacancy rate of accommodation facilities in a destination area, it is possible to attract tourists to the inactive area and lead to activation of the area. In addition, the route deriving unit 22 has a function of deriving information on a combination of a route for moving between destinations for each date derived by the destination deriving unit 21 and transportation means for moving on the route. Details of the method for deriving the route will also be described later.

The master management unit 30 has a function of updating, maintenance, or the like, of master-system DBs such as the destination master DB 31, the accommodation facility DB 32, the line master DB 33, the transportation means master DB 34, and the transit point master DB 35. Content of these databases will be described later.

For example, master data related to the transportation means and transportation facilities such as the line master DB 33, the transportation means master DB 34, and the transit point master DB 35 may automatically collect information from an external transportation means information provider 5*a* by API cooperation, web scraping, or other means at intervals such as once in several months so that information such as timetable or timetable revision is reflected. On the other hand, data such as the accommodation facility DB 32 in which vacancy information and fees change on a daily basis is desirably collected from an external accommodation facility information provider 5*b* frequently at intervals such as once every day or several days. A configuration is not limited to the configuration in which information is automatically collected and updated and may be a configuration including an interface in which update data acquired by some means outside the system can be manually imported or updated to these databases.

In a case where the user selects and adopts the travel plan proposed by the travel plan proposal system 1 of the present embodiment (including a case where the user corrects the travel plan), a reservation cooperation unit 40 has a function of recording information of the selected travel plan in a selection history DB 41 as a history and enabling the user to actually make a reservation or purchase a ticket for transportation means or accommodation facilities included in the travel plan. Although it may be possible to directly make a reservation and purchase through the reservation cooperation unit 40 by cooperating with an external reservation and sales system 4 through API cooperation, or the like, in the present embodiment, it is assumed that the user is guided to the external reservation and sales system 4 (the service may be a service that enables comprehensive reservation like a travel agency or may be a reservation site unique to an individual accommodation facility) and then makes a reservation and purchase independently on the reservation and sales system 4 side.

<Screen Transition Example>

FIG. 2 is a view illustrating outline of an example of screen transition according to an embodiment of the present invention. These screens are displayed on the user terminal 3 by the user interface unit 10 of the travel plan proposal system 1.

A screen serving as a starting point of processing of the travel plan proposal is a condition input screen (W1). FIG. 3 is a view illustrating outline of an example of the condition input screen (W1) according to an embodiment of the present invention. In this screen, the user inputs a desired condition of a travel plan. As illustrated in FIG. 3, the condition includes, for example, a total budget, a departure place, a desired travel period, the number of nights to stay, the number of traveling people, and the like, but the destination is not included in the condition because the travel plan proposal system 1 automatically selects and proposes the destination. When the condition is input and a "search" button is pressed, the screen transitions to a travel plan candidate selection screen (W2) as illustrated in FIG. 2.

FIG. 4 is a view illustrating outline of an example of the travel plan candidate selection screen (W2) according to an embodiment of the present invention. On this screen, candidates for the travel plan meeting the condition input on the condition input screen (W1) are displayed, and selection by the user can be accepted. Even in each travel plan candidate, the user can select the transportation means and the accommodation facility on the basis of a schedule, a time zone, and fees. Hatching in the drawing indicates transportation means or accommodation facility selected by the user from the candidates. When a "set condition" button is pressed, the screen transitions to a display priority setting screen (W3) as illustrated in FIG. 2. As illustrated in FIG. 2, when an "option" button is pressed, the screen transitions to an option selection screen (W4).

Figures 5, 6:
FIG. 5 is a view illustrating outline of an example of a display priority setting screen according to an embodiment of the present invention.
FIG. 6 is a view illustrating outline of an example of an option selection screen according to an embodiment of the present invention.

FIG. 5 is a view illustrating outline of an example of the display priority setting screen (W3) according to an embodiment of the present invention. On this screen, it is possible to designate more detailed conditions for transportation means and accommodation facility than on the condition input screen (W1) in FIG. 3. When the condition is designated and a "re-display" button is pressed, as illustrated in FIG. 2, the screen returns to the travel plan candidate selection screen (W2), and a result of re-searching the travel plan candidates under the designated condition is displayed.

FIG. 6 is a view illustrating outline of an example of the option selection screen (W4) according to an embodiment of the present invention. On this screen, travel options available around the destination and the place of stay are presented, and the user can select the travel options. The options are preferably sightseeing spots, facilities, stores, events, coupons, or the like, that lead to consumption in the target region or regional revitalization. When the option is designated and a "select" button is pressed, the screen returns to the travel plan candidate selection screen (W2) as illustrated in FIG. 2.

Figures 7, 8:
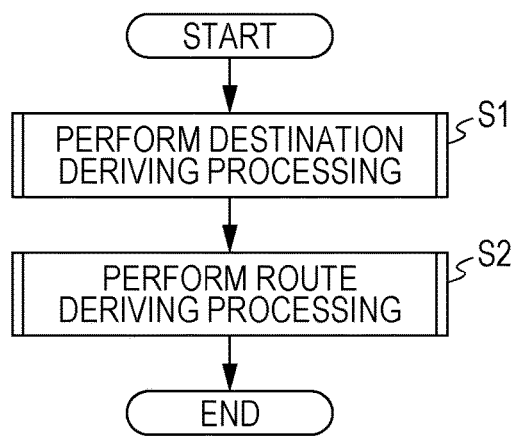
FIG. 7 is a view illustrating outline of an example of a travel plan information screen according to an embodiment of the present invention.
FIG. 8 is a flowchart illustrating outline of an example of entire processing flow of travel plan proposal processing according to an embodiment of the present invention.

As illustrated in FIG. 2, in the travel plan candidate selection screen (W2), when the user designates a desired travel plan candidate and presses the "select" button, the screen transitions to a travel plan information screen (W5). FIG. 7 is a view illustrating outline of an example of the travel plan information screen (W5) according to an embodiment of the present invention. On this screen, detailed information on the travel plan selected on the travel plan candidate selection screen (W2) is displayed, and in a case where the user presses a "reserve" button, the user is guided to a website, or the like, of the external reservation and sales system 4 so that the user can make a reservation, purchase a ticket, and the like.

<Processing Flow (Outline)>

FIG. 8 is a flowchart illustrating outline of an example of processing flow of the entire travel plan proposal processing according to an embodiment of the present invention. First, the destination deriving unit 21 of the travel plan candidate deriving unit 20 performs destination deriving processing (S1). Here, a candidate for a destination to visit for each date within a desired period is derived on the basis of a budget designated by the user and information on a desired period for travel and the desired number of nights to stay.

Figure 9:
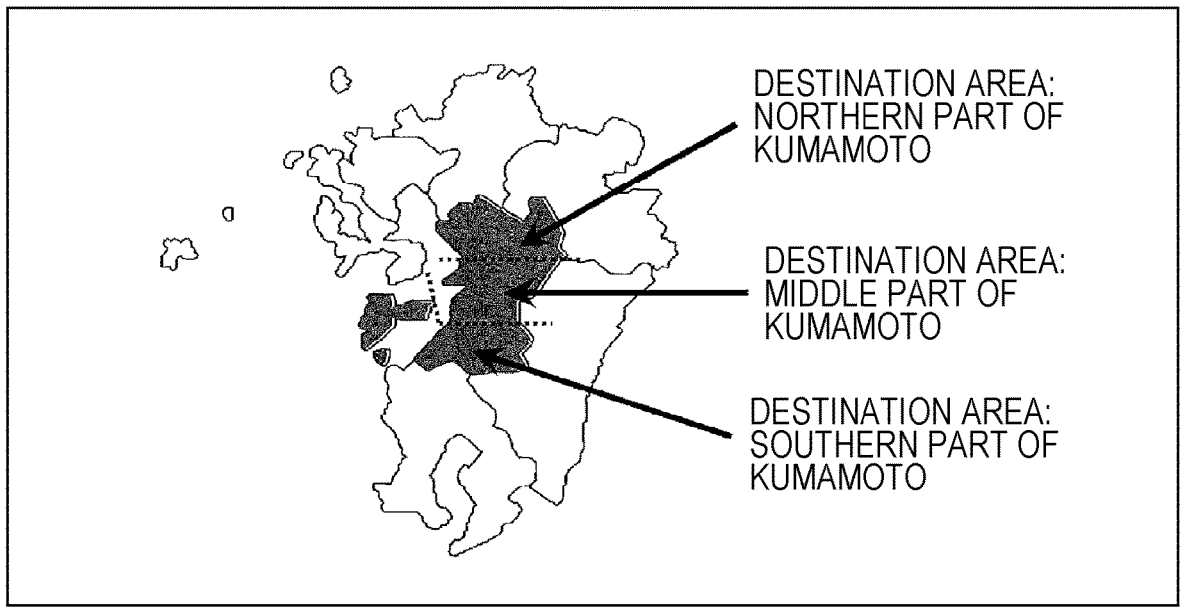
FIG. 9 is a view illustrating outline of an example of a destination area according to an embodiment of the present invention.

FIG. 9 is a view illustrating outline of an example of a destination area according to an embodiment of the present invention. In the present embodiment, a predetermined area (which is basically the entire area of Japan in a case of Japan, but may be limited to part of the area. Further, the predetermined area may include other countries as well as Japan) is divided into predetermined regions (hereinafter, may be referred to as "destination areas"), and a candidate for the destination in the travel plan is derived in units of destination areas.

In the example of FIG. 9, an example is illustrated in a case where Kumamoto prefecture is divided into three regions of northern part, middle part, and southern part, and each region is set as a destination area. Here, the division is simply based on a geographical shape, but the predetermined area is preferably divided into ranges that match purposes of regional revitalization. For example, it is conceivable to divide the predetermined area so that population, tourist resources, and the like, in each destination area are allocated as evenly as possible. The destination area may be set manually or automatically using artificial intelligence (AI). Information on the set destination area is registered in advance in the destination master DB 31 described later.

In the present embodiment, as described above, basically, an inactive area, that is, an area selected based on vacancy rates of accommodation facilities in a destination area is preferentially proposed as a candidate, so that it is possible to attract tourists to the inactive area and lead to activation of the region. In other words, in the present embodiment, a destination area for which "a total of accommodation costs falls within the travel budget in the descending order of the vacancy rates of the accommodation facilities in the area" is derived as a candidate. By using the vacancy rates as a reference instead of the number of vacant rooms, it is possible to eliminate influence of a difference in the number of accommodation facilities for each destination area as far as possible (that is, a difference in scale for each destination area) (it is considered that the number of vacant rooms is larger as the number of accommodation facilities is larger).

Note that, regarding the accommodation cost to be used to determine whether the accommodation costs fall within the budget, in the present embodiment, a median of the accommodation costs of all the accommodation facilities in the destination area is used as a representative accommodation cost, but the present invention is not limited thereto. The reason why the median is used is that, in general, the accommodation cost of an accommodation facility is divided into two, that is, a relatively inexpensive facility such as a business hotel and an expensive facility such as a luxurious hotel. For example, if an average value is used, there may be no accommodation facility in a price range around the average value. By using the median, it is possible to increase a possibility that an accommodation facility for the accommodation cost corresponding to the price actually exists (in particular, when the number of accommodation facilities in the destination area is an odd number, there is always an accommodation facility corresponding to the median).

Figure 10:
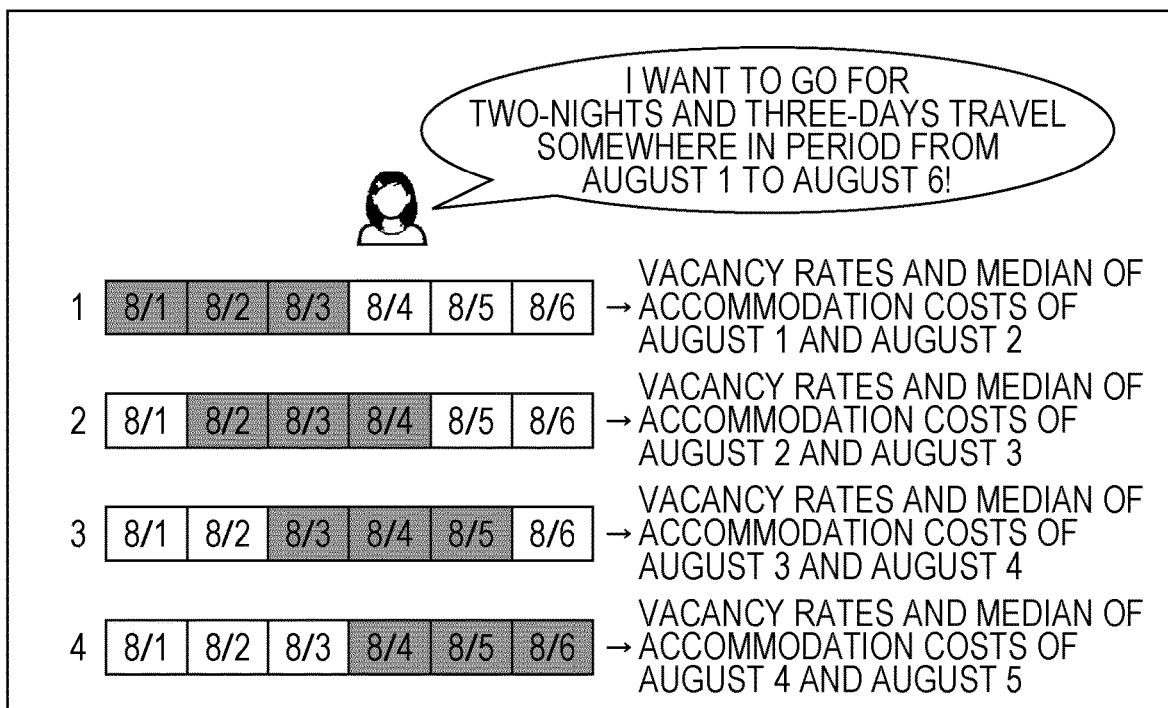
FIG. 10 is a view illustrating outline of an image of use of a vacancy rate and a median of an accommodation cost according to an embodiment of the present invention.

FIG. 10 is a view illustrating outline of an image of use of the vacancy rate and the median accommodation cost according to an embodiment of the present invention. The example in the drawing illustrates an example of a case where the user desires to go for a two-nights and three-days travel somewhere in a period from August 1 to August 6. In this case, there are four schedules of three days and two nights within the desired travel period of the user, as indicated by hatching in the figure, "from August 1 to August 3", "from August 2 to August 4", "from August 3 to August 5", and "from August 4 to August 6". For each of the four schedules, the vacancy rate and the median accommodation cost are derived for each accommodation date, and the destination area for each accommodation date is derived on the basis of the vacancy rate and the median accommodation cost.

Returning to FIG. 8, next, the route deriving unit 22 of the travel plan candidate deriving unit 20 performs route deriving processing (S2). Here, for the destination area for each date derived by the destination deriving processing in step S1, information on a combination of a route for departing from a departure place, moving to each destination area, and finally returning to the departure place, and means of transportation for moving on the route is derived and proposed as a candidate for the travel plan.

<Processing Flow (Details)>

Figure 11:
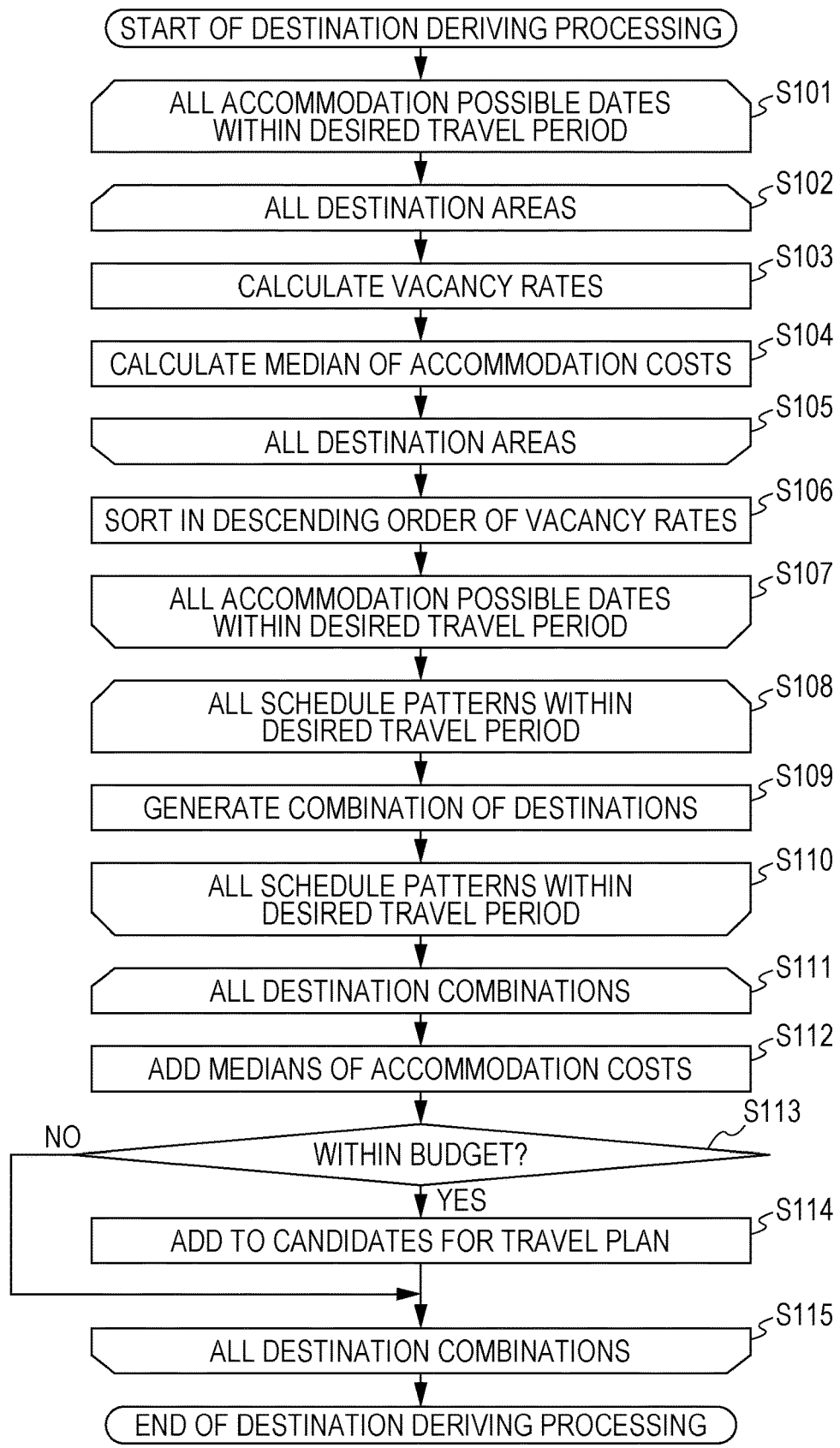
FIG. 11 is a flowchart illustrating outline of an example of flow of destination deriving processing according to an embodiment of the present invention.

FIG. 11 is a flowchart illustrating outline of an example of flow of destination deriving processing (step S1 in FIG. 8) in an embodiment of the present invention. In the destination deriving processing, first, first loop processing of repeating processing for all the accommodation possible dates (in the example of FIG. 10, each date from August 1 to August 5) within the desired travel period designated by the user is started (S101). In the first loop processing, first, second loop processing of repeating processing for all the destination areas registered in the destination master DB 31 for the processing target date is started (S102).

In the second loop processing, the vacancy rate of the processing target destination area on the processing target date is calculated (S103). Specifically, for all the accommodation facilities registered in the accommodation facility DB 32 as being located in the processing target destination area, information on the number of vacant rooms and the number of all the rooms is acquired from the accommodation facility DB 32, and the total number of vacant rooms of these accommodation facilities is divided by the total number of all the rooms. Furthermore, the median of the accommodation cost is calculated for all the accommodation facilities in the processing target destination area (S104). A method for calculating the vacancy rate in step S103 is not limited to the above method. For example, accommodation facilities to be calculated in the destination area may be narrowed down under a predetermined condition.

When the processing for all the destination areas is finished and the second loop processing is finished (S105), each destination area is sorted in descending order of vacancy rate (S106). At this stage, filtering may be performed, for example, to exclude a result of sorting that is equal to or lower than a predetermined rank or to exclude a result of sorting that has a vacancy rate lower than a certain value.

When the processing for all the accommodation possible dates is finished and the first loop processing is finished (S107), a list of destination areas sorted in descending order of the vacancy rate is generated for each of all the accommodation possible dates. For example, in the example of FIG. 10, the following list is generated.

Accommodation possible date: destination area (vacancy rate)
- August 1: northern part of Kumamoto (99%), southern part of Fukuoka (98%), western part of Oita (97%), . . . .
- August 2: northern part of Kumamoto (99%), western part of Oita (98%), southern part of Fukuoka (97%), . . . .
- August 5: western part of Oita (99%), southern part of Kumamoto (97%), northern part of Kumamoto (96%), . . . .

Note that, in the above example, a series of processing (steps S102 to S106) of obtaining the vacancy rates for all the target destination areas by the first loop processing (steps S101 and S107) and sorting the destination areas on the basis of the vacancy rate is repeatedly executed for each accommodation possible date. However, such a processing method is merely an example, and the present invention is not limited thereto.

For example, the destination deriving unit 21 (or only a portion that executes the above series of processing) may be configured such that parallel processing or distributed processing can be performed by a plurality of server devices, virtual servers, or the like, and the above series of processing (steps S102 to S106) may be sped up by performing parallel processing or distributed processing by individual servers (parallel processing servers) for each accommodation possible date, instead of being repeatedly executed for each accommodation possible date. For example, in the example of FIG. 10, parallel processing or distributed processing is executed by five parallel processing servers that individually execute the above-described series of processing for each of August 1 to August 5 of the accommodation possible dates (for five days). Note that the parallel processing server and the accommodation possible dates to be processed do not necessarily have to be on a one-to-one basis and may be on a one-to-n basis.

In order to enable such a configuration, for example, information on accommodation facilities registered in the accommodation facility DB 32 is prepared as a sub-DB that is divided and duplicated for each date of each month of staying. For example, for April, 30 sub-DBs subdivided into April 1 to April 30 of each stay date are prepared. As a result, each parallel processing server can execute processing by directly referring to the sub DB of the date corresponding to the accommodation possible date of the processing target of the parallel processing server and can efficiently generate a list of the destination areas of the target accommodation possible dates. It is also possible to further increase the speed by constituting each of the sub DBs using the memory DB, or the like.

Next, third loop processing of repeating processing for all the schedule patterns (in the example of FIG. 10, there are four schedules of "August 1 to August 3", "August 2 to August 4", "August 3 to August 5", and "August 4 to August 6") within the desired travel period is started (S108). In the third loop processing, for each stay date in the processing target schedule pattern, a predetermined number of destination areas are extracted in descending order of the vacancy rate sorted in step S106, and a combination thereof is generated (S109). Here, the destination areas are mechanically combined for each stay date.

For example, in the example of FIG. 10, in a case where the number of destinations that the user desires to visit (for example, designated in a field of the "number of accommodation facilities" in the example of the condition input screen (W1) in FIG. 3) is 2, which is the same as the number of nights to stay, in the schedule pattern of "August 1 to August 3", the following combination of destination areas is generated.

Stay date: destination area (vacancy rate)
August 1: northern part of Kumamoto (99%)+August 2: western part of Oita (98%)
August 1: northern part of Kumamoto (99%)+August 2: southern part of Fukuoka (97%)
August 1: southern part of Fukuoka (98%)+August 2: northern part of Kumamoto (99%)

Note that, as in this example, in a case where the number of destinations that the user desires to visit is the same as the number of nights to stay and is two or more, a combination in which the same destination area is set on different stay dates is not generated. On the other hand, in a case where the number of destinations that the user desires to visit is smaller than the number of nights to stay, the number of nights to stay is equally allocated to each destination area, and in a case where there is a remainder as a result of the allocation, the number of nights to stay is allocated to the number of nights to stay of the first destination. In a case where the number of destinations that the user desires to visit is one (for example, in the example of the condition input screen (W1) in FIG. 3, when a field of "desire to stay in same facility" is selected), only combinations with the same destination area for all stay dates are generated.

When the processing for all the schedule patterns is finished and the third loop processing is finished (S110), fourth loop processing of repeating processing for all the combinations of destination areas generated in step S109 is started (S111). In the fourth loop processing, first, the median accommodation costs calculated in step S104 is added for the destination area for each stay date included in the combination to be processed (S112). Then, it is determined whether or not the added median accommodation cost is within the travel budget (S113), and in a case where the median accommodation cost is within the budget (S113: Yes), a combination of destination areas to be processed is added to the list of candidates for the travel plan (S114).

For example, in the example of FIG. 10, assuming that the budget is 100,000 yen, the following is obtained.

Stay date: destination area (median accommodation cost)
August 1: northern part of Kumamoto (40,000 yen)+ August 2: western part of Oita (50,000 yen)→added to candidates for the travel plan
August 1: northern part of Kumamoto (40,000 yen)+ August 2: southern part of Fukuoka (70,000 yen)→x
August 1: southern part of Fukuoka (60,000 yen)+August 2: northern part of Kumamoto (30,000 yen)→added to candidates for the travel plan When the processing for all the combinations of destination areas is finished and the fourth loop processing is finished (S115), the destination deriving processing is finished.

Figure 12:
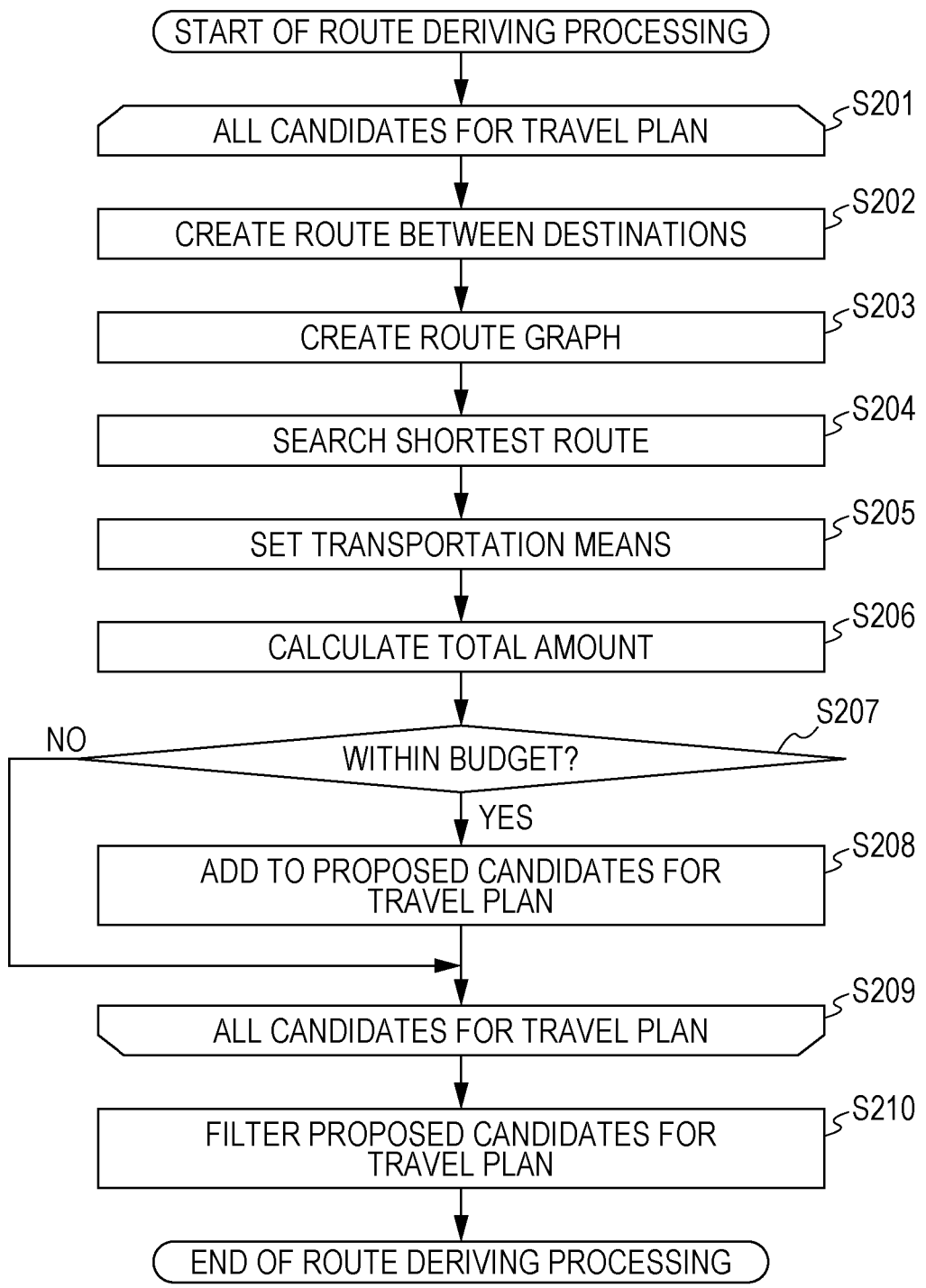
FIG. 12 is a flowchart illustrating outline of an example of flow of route deriving processing according to an embodiment of the present invention.

FIG. 12 is a flowchart illustrating outline of an example of flow of route deriving processing (step S2 in FIG. 8) according to an embodiment of the present invention. In the route deriving processing, first, first loop processing of repeating the processing for all the candidates for the travel plan (combinations of destination areas) derived in the destination deriving processing (step S1 in FIG. 8) is started (S201). In the first loop processing, first, a route for moving between destination areas included in the candidates for the travel plan to be processed is created (S202). For example, in a case where n destination areas are included in the candidates for the travel plan, a route is arranged as the departure place→destination 1→destination 2→ . . . →destination n→the departure place.

Next, a route graph in which stations, bus stops, airports, and the like, are set as nodes and lines are combined as edges is created on the basis of information on lines registered in advance in the line master DB 33 and information on transit points registered in advance in the transit point master DB 35 so that the created routes can be moved in that order (S203). In the present embodiment, the lines are limited to lines of "airplane", "bullet train", "conventional line", and "expressway bus", but may include lines of other transportation facilities (water transportation such as ferries, subways, route buses, and the like).

For each node of the route graph, the departure place is set to the nearest one among stations, bus stops, airports, and the like, related to the departure place and the arrival place in each line registered in the line master DB 33 within a range where the user can move from the home in a predetermined short time period. As for the accommodation facility in the destination area, first, the accommodation facility corresponding to the median accommodation cost is used as a representative, and the nearest one of stations, bus stops, airports, and the like, registered in the line master DB 33 is set. Note that information such as the nearest station, bus stop, and airport to each accommodation facility is registered in advance in the accommodation facility DB 32. A time period required for moving in a target section (the shortest time period in a case where there are a plurality of patterns) is set as a weight for the edge of the route graph. The information on the required period of each line is registered in the line master DB 33 in advance.

Then, with respect to the created route graph, for each schedule in which moving to another destination area occurs, the shortest route search is performed on the basis of the weight of the required time period set for the edge, and a route for moving between the destination areas is determined (S204). An algorithm of the shortest route search is not particularly limited, and an appropriate algorithm can be used. The route does not necessarily have to be the "shortest" route, and the route may be determined on the basis of an appropriate condition. Further, for each node included in the route graph determined as the route, the transportation means existing between the nodes is acquired from the transportation means master DB 34 and set (S205). In a case where a plurality of corresponding transportation means is obtained, for example, inexpensive means that is closer to the required time period set as the weight in the corresponding edge may be selected. Note that a series of processing in steps S204 and S205 may be performed using an external so-called transit guidance service, or the like.

Thereafter, a total amount of the accommodation fee (initially the median accommodation cost) of each destination area on the route and traffic expense of the transportation means between the nodes set in step S205 is calculated (S206). Then, it is determined whether the calculated total amount is within the travel budget (S207), and in a case where the calculated total amount is within the budget (S207: Yes), the candidate for the travel plan to be processed is added to the list of the proposed candidates for the travel plan (S208).

For example, in the example of FIG. 10, in a case where the budget of the user is 100,000 yen, the following travel plan is added to the list of the proposed candidates for the travel plan.

Stay date: travel plan
August 1: Haneda→Kumamoto (airplane) 9000 yen
Kumamoto→Kurokawa (expressway bus) 2000 yen
Accommodation place (stay) in northern part of Kumamoto 30,000 yen
August 2: Kurosawa→Yufu (conventional line) 7000 yen
Accommodation place (stay) in western part of Oita 40,000 yen
August 3: Yufu→Fukuoka (expressway bus) 3000 yen
Fukuoka→Haneda (airplane) 9000 yen
Total 100,000 yen When the processing for all the candidates for the travel plan is finished and the first loop processing is finished (S209), filtering processing of organizing and narrowing down content of the list of the proposed candidates for the travel plan created in step S208 is performed (S210). In a case where a plurality of candidates for the travel plan are added to the list of the proposed candidates for the travel plan, for example, an inexpensive candidate for the travel plan may be preferentially proposed on the travel plan candidate selection screen (W2) of FIG. 4 by sorting the candidates for the travel plan in ascending order of the total amount. Furthermore, the sorting method may be changed on the basis of the condition set on the condition setting screen (W3) in FIG. 5, or the sorting result may be narrowed down by excluding those having a predetermined rank or lower. The list of the proposed candidates for the travel plan filtered in step S210 is output, and the route deriving processing is finished.

The content of the candidates for the travel plan is displayed on the travel plan candidate selection screen (W2) illustrated in FIG. 4 on the basis of the content of the proposed candidates for the travel plan derived by the series of processing (the destination deriving processing (S1) and the route deriving processing (S2)). At the time of displaying the candidates for the travel plan, not only the transportation means used to derive the target proposed candidate for the travel plan is displayed as described above, but also the transportation means in time zones before and after the target proposed candidate for the travel plan may be extracted from the transportation means master DB 34 to be described later and presented as a selectable list as illustrated in FIG. 4.

Furthermore, regarding the accommodation facility, in addition to the accommodation facility corresponding to the median accommodation cost in the destination area derived in the proposed travel plan candidate, the accommodation facility having a vacant room that meets the condition designated by the user, such as the number of guests and a room type (single, twin, etc.), in the target destination area may be extracted from the accommodation facility DB 32 which will be described later and presented as a selectable list as illustrated in FIG. 4. In this event, for example, on the basis of an instruction, or the like, from the user, ranking may be displayed in descending order of accommodation price, or the ranking may be weighted on the basis of a predetermined index such as advertisement rates contributed by each accommodation facility.

As described above, the user can appropriately select transportation means or an accommodation facility from the presented options, in which case, the total amount of travel expenses is not limited within the budget designated by the user. Furthermore, for example, in a case where the user changes selection of the accommodation facility and thereby the nearest station being changed, the route graph is reconfigured with the nearest station as a reference, and the route search is performed again (the route deriving processing in FIG. 12 is executed again). However, also in this case, the total amount of travel expenses is not limited within the budget, and even if the total amount of travel exceeds the budget, the total amount of travel expenses can be presented as it is.

Note that, in the present embodiment, only "airplane", "bullet train", "conventional line", and "expressway bus" are targeted as lines in the candidate for the travel plan, and thus transportation means (for example, a subway, a taxi, a route bus, or the like) between the accommodation facility in the destination area and the nearest station in these lines are excluded from the targets of proposal. In addition, as illustrated in the option selection screen (W4) of FIG. 6, sightseeing spots, facilities, events, and the like, in the destination area are proposed as options, but are not considered in the series of processing related to the above-described derivation of the proposed candidate for the travel plan.

<Data Configuration>

FIG. 13 is a view illustrating outline of a configuration of the destination master DB and examples of specific data according to an embodiment of the present invention. The destination master DB 31 is a table that stores master information regarding a destination area that can be proposed in the travel plan by the travel plan proposal system 1 of the present embodiment, and includes, for example, items such as a destination area, a belonging area, latitude and longitude, a sightseeing information ID, a sale adjustment value, adjustment start time, and adjustment end time.

The item of the destination area holds information of a name uniquely specifying the target destination area. The item of the belonging area holds information of an area to which the target destination area belongs. While granularity of the region is not particularly specified, the region can be classified into, for example, Hokkaido, Tohoku, Kanto, Chubu, Kinki, Chugoku, Shikoku, and Kyushu. The item of latitude and longitude is information for specifying outline of a geographical position of the target destination area and holds, for example, information of latitude and longitude of a representative place in the destination area. The representative place is not particularly limited and may be, for example, a location center in the area of the destination area or a location of a representative sightseeing spot, city, or the like, in the destination area.

The item of the sightseeing information ID holds information of one or more IDs for specifying sightseeing information (sightseeing spots, facilities, stores, events, services, and the like) to be recommended to the user in the target destination area. The sightseeing information corresponding to the ID is registered in advance in, for example, a sightseeing information master DB (not illustrated), or the like. Optimal recommended sightseeing information may be set according to a season or time of year. The sightseeing information can be presented as options, for example, on the option selection screen (W4) in FIG. 6.

The item of the sale adjustment value holds weighting information for enabling an administrator to set a degree of ease of the target destination area being selected when the candidate for the travel plan is derived. In the example of the destination deriving processing (S1) illustrated in FIG. 11, only the vacancy rate is considered in deriving the destination area, but by also considering the sale adjustment value, it is possible to perform adjustment so that the destination area that the operation side of the travel plan proposal system 1 desires to actively propose and sell is easily selected as a visit candidate place. For example, when the destination areas are sorted in descending order of the vacancy rate in step S106 of the destination deriving processing (S1) of FIG. 11, the destination area in which a large value is set as the sale adjustment value can be easily ranked high in the sorting result by applying the sale adjustment value as the weighting value for the vacancy rate. The items of the adjustment start time and the adjustment end time respectively hold information of start date and the end date of a period to which the above-described sale adjustment value is applied.

FIG. 14 is a view illustrating outline of a configuration of the accommodation facility DB and examples of specific data according to an embodiment of the present invention. The accommodation facility DB 32 is a table that stores information such as a vacant room and a fee for each stay date for the accommodation facility that can be proposed in the travel plan by the travel plan proposal system 1 of the present embodiment, and includes, for example, items such as name of the accommodation facility, a destination area, a near station, latitude and longitude, an address, a room type, the number of rooms, a stay date, a fee, a meal, and the number of vacancies.

The name of the accommodation facility holds information on name that specifies the target accommodation facility. Even in a case where there are a plurality of accommodation facilities having the same name, it is possible to uniquely specify the accommodation facility with the destination area and the address together with the content of items such as the destination area and the address to be described later. The item of the destination area holds information on the destination area to which the target accommodation facility belongs. The information on the destination area is registered in the destination master DB 31 described above. The item of the nearest station holds information such as the nearest station, bus stop, and airport of the target accommodation facility. In a case where there are a plurality of stations, and the like, within a predetermined distance that can be evaluated as "nearest" from the target accommodation facility, all of them may be registered. Each item of the latitude and longitude and the address holds information on the latitude and longitude of the location of the target accommodation facility and information on the address. Each item of the room type and the number of rooms holds information on the total number of rooms for each room type included in the target accommodation facility.

The item of the stay date holds information of a target date of the vacancy information in the target accommodation facility and room type. The items of the fee and the meal respectively hold information on the accommodation fee and whether or not the meal is served on the target date. The item of the vacant room holds information on the number of vacant rooms of the target room type on the target date. Note that, in a case where the fee, or the like, varies depending on the grade of the room even if the room type is the same "single" or "twin", more detailed content may be set according to the grade as the item of the room type.

FIG. 15 is a view illustrating outline of a configuration of the line master DB and examples of specific data according to an embodiment of the present invention. The line master DB 33 is a table that stores master information about lines owned by transportation means that can be used when moving between destination areas or within a destination area, and includes, for example, items such as a departure place, an arrival place, transportation means, and an average required time period.

The items of the departure place and the arrival place respectively hold information on a station, a bus stop, an airport, and the like, of the departure place and the arrival place of the target line. In a case where a round-trip service is set in the target line, for example, a record in which the departure place and the arrival place are switched is registered. The item of the transportation means holds information on transportation means in the target line. As described above, in the present embodiment, the transportation means is limited to a relatively long distance transportation means such as "airplane", "bullet train", "conventional line", and "expressway bus" that allows moving between destination areas, but it is not necessary to cover all of these transportation means, and other transportation means are not excluded. The item of the average required time period holds information on an average required time period (minutes) for moving the target line by the target transportation means. By assigning a larger weight as this value is smaller, it is possible to propose a line (transportation means) having a shorter average required time period in the same line.

FIG. 16 is a view illustrating outline of a configuration of the transportation means master DB and examples of specific data according to an embodiment of the present invention. The transportation means master DB 34 is a table that stores master information related to operation content of transportation means for moving along each line registered in the line master DB 33, and includes, for example, items such as a departure place, an arrival place, transportation means, service name, departure time, arrival time, traffic expense, effective start time, and effective end time.

The items of the departure place, the arrival place, and the transportation means respectively hold the same content as the corresponding items of the line master DB 33. The item of the service name holds information on service name (if set) of an individual operation service in the target transportation means. The items of the departure time, the arrival time, and the traffic expense respectively hold information on the departure time, the arrival time, and the traffic expense of the target service. The items of the effective start time and the effective end time respectively hold information on start time and end time of an effective period to which the content of the items of the departure time, the arrival time, and the fare of the target service are applied.

FIG. 17 is a view illustrating outline of a configuration of the transit point master DB and examples of specific data according to an embodiment of the present invention. The transit point master DB 35 is a table that holds master information about transit points that relay respective lines registered in the line master DB 33, and includes, for example, items such as an arrival transit point, arrival transportation means, a departure transit point, and departure transportation means.

The item of the arrival transit point holds information on a station, a bus stop, an airport, and the like, at the time of arrival at the target transit point, and the item of the arrival transportation means holds information on transportation means until arrival at the target transit point. Furthermore, the item of the departure transit point holds information on a station, a bus stop, an airport, and the like, at the time of departure from the target transit point, and the item of the departure transportation means holds information of transportation means at the time of departure from the target transit point. With such a data structure, even in a case where transportation means to be used before and after the transit is different at the transit point (including both the arrival transit point and the departure transit point), it is possible to cope with such a case.

CONCLUSION

As described above, according to the travel plan proposal system 1 of the present embodiment, by preferentially selecting mainly an inactive area and proposing a destination area to a user who says "I want to go somewhere" without particularly limiting destinations and attracting the user to the destination, it is possible to lead to activation of the destination area and to provide the user with surprise for selection of the destination and the travel plan.

Although the invention made by the present inventors has been specifically described on the basis of the embodiment, the present invention is not limited to the above embodiment, and it goes without saying that various modifications can be made without departing from the gist of the present invention.

For example, while information on the travel plan (transportation means and accommodation facilities) finally selected by the user with respect to the candidates for the travel plan proposed by the travel plan proposal system 1 of the present embodiment is accumulated in the selection history DB 41, the content thereof may be learned by an AI engine which is not illustrated as teacher data. If the learning proceeds sufficiently, for example, when a similar candidate for the travel plan is proposed to the user, it is also possible to propose transportation means and accommodation facilities optimized by AI as recommended transportation means and accommodation facilities.

Furthermore, while in the present embodiment, the user selects the travel plan from the candidates for the travel plan presented on the travel plan candidate selection screen (W2) of FIG. 4, for example, in a case where the user desires, one travel plan may be automatically determined from the candidates for the travel plan by a random number, or the like, (or AI) and proposed.

The above embodiment has been described in detail in order to explain the present invention in an understandable manner, and the present invention is not necessarily limited to one including all the configurations described. Another configuration can be added to, deleted from, and replaced with part of the configuration of the above-described embodiment.

Part or all of the above-described configurations, functions, processing units, processing means, and the like, may be implemented by hardware by being designed as an integrated circuit, or the like. Alternatively, the above configurations, functions, and the like, may be implemented by software by a processor interpreting and executing a program that implements each function. Information such as programs, tables, and files for implementing each function can be stored in a recording device such as a memory, a hard disk, and a solid state drive (SSD), or in a recording medium such as an IC card, an SD card, and a DVD.

The above drawings illustrate control lines and information lines that are considered necessary for the description and do not necessarily illustrate all the implemented control lines and information lines. In practice, it may be considered that almost all components are interconnected.

The present invention is applicable to a destination proposal type travel plan proposal system in consideration of regional revitalization.

What is claimed is:

1. A travel plan proposal system that proposes a travel plan to a user, the travel plan including a combination of one or more destination areas, accommodation facilities in the respective destination areas, and a route and transportation means for moving between the destination areas, the travel plan proposal system comprising:
    a destination information recording unit configured to store information on all destination areas set in a travelable area;
    an accommodation facility information recording unit configured to store information, including accommodation costs, concerning the accommodation facilities in the respective destination areas;
    a destination deriving unit configured to extract a predetermined number of destination areas from a plurality of destination areas stored in the destination information recording unit on a basis of vacancy rates calculated for a plurality of accommodation facilities located in the destination areas for stay dates included in a schedule pattern for each schedule pattern obtained from a desired travel period and a number of nights to stay designated by the user, and derive one or more candidates for the travel plan including a combination of the schedule pattern and the destination areas for each of the stay dates; and
    a route deriving unit configured to set, for each of the candidates for the travel plan, a predetermined route for sequentially moving from a departure place of the user to the respective destination areas included in the candidates for the travel plan and returning to the departure place on a basis of information including lines, a required time period, and a transit point included in predetermined transportation means, and transportation means to be used for moving, and derive, as a proposed candidate for the travel plan, the candidate for the travel plan in which a total of representative accommodation costs of the destination areas in the candidate for the travel plan and a total of traffic expenses required for the transportation means to be used for moving are within a budget designated by the user.

2. The travel plan proposal system according to claim 1, wherein each of the representative accommodation costs in the respective destination areas is a median of accommodation costs at a target stay date related to all accommodation facilities set within the destination area, the accommodation costs being acquired from the accommodation facility information recording unit.

3. The travel plan proposal system according to claim 1, wherein the destination deriving unit extracts the predetermined number of destination areas on a basis of the vacancy rates calculated for the respective destination areas for each of the stay dates while weighting the destination areas with adjustment values set for the respective destination areas.

4. The travel plan proposal system according to claim 1, wherein, for the destination areas set in the proposed candidate for the travel plan, accommodation facilities for which accommodation costs corresponding to the representative accommodation costs are set are presented to the user as recommended accommodation facilities in the destination areas.

5. The travel plan proposal system according to claim 1, wherein a plurality of accommodation facilities located within the destination areas are ranked in accordance with a predetermined criterion for the destination areas set in the proposed candidate for the travel plan and presented to the user as ranking of the accommodation facilities in the destination areas.

6. The travel plan proposal system according to claim 1, wherein, when predetermined routes are set for the candidates for the travel plan, the route deriving unit sets accommodation facilities for which accommodation costs corresponding to the representative accommodation costs in the destination areas are set, as the accommodation facilities in the destination areas.

* * * * *